United States Patent
Kawaguchi et al.

(10) Patent No.: US 9,802,794 B2
(45) Date of Patent: Oct. 31, 2017

(54) CRANE APPARATUS, CONTAINER YARD, AND FEEDING METHOD

(71) Applicant: MITSUI ENGINEERING & SHIPBUILDING CO., LTD., Tokyo (JP)

(72) Inventors: Masaharu Kawaguchi, Oita (JP); Soshi Sato, Oita (JP); Koji Ohi, Oita (JP)

(73) Assignee: MITSUI ENGINEERING & SHIPBUILDING CO., LTD., Tokyo (JP)

( * ) Notice: Subject to any disclaimer, the term of this patent is extended or adjusted under 35 U.S.C. 154(b) by 120 days.

(21) Appl. No.: 14/767,271

(22) PCT Filed: Feb. 13, 2013

(86) PCT No.: PCT/JP2013/053326
§ 371 (c)(1),
(2) Date: Aug. 11, 2015

(87) PCT Pub. No.: WO2014/125576
PCT Pub. Date: Aug. 21, 2014

(65) Prior Publication Data
US 2016/0002011 A1 Jan. 7, 2016

(51) Int. Cl.
| | |
|---|---|
| *B66C 13/12* | (2006.01) |
| *H02M 7/08* | (2006.01) |
| *B66C 13/28* | (2006.01) |
| *H02M 7/06* | (2006.01) |
| *H02P 27/06* | (2006.01) |

(52) U.S. Cl.
CPC .............. *B66C 13/12* (2013.01); *B66C 13/28* (2013.01); *H02M 7/06* (2013.01); *H02M 7/08* (2013.01); *H02P 27/06* (2013.01)

(58) Field of Classification Search
CPC ........... H02P 27/06; H02M 7/06; B66C 13/28
USPC .......................................................... 307/89
See application file for complete search history.

(56) References Cited

FOREIGN PATENT DOCUMENTS

| | | |
|---|---|---|
| JP | 2003-061360 A | 2/2003 |
| JP | 2009-023817 A | 2/2009 |
| JP | 2012-211005 A | 3/2011 |
| JP | 2011-162287 A | 8/2011 |
| JP | 2013-039988 A | 8/2011 |
| JP | 2013-056760 A | 9/2011 |
| JP | 2013-006641 A | 1/2013 |

OTHER PUBLICATIONS

JEAG 9702-1995, Edited by the Japan Electric Association, The Japan Electric Association, Oct. 15, 1995. pp. 88-91, 108-120.
International Search Report and Written Opinion in PCT/JP2013/053326 dated Aug. 18, 2015, in English translation.

*Primary Examiner* — Robert Deberadinis
(74) *Attorney, Agent, or Firm* — Blakely Sokoloff Taylor & Zafman LLP

(57) ABSTRACT

A three-phase full-wave rectifier (21) performs full-wave rectification of three-phase AC power (11A) supplied from ground power supply equipment, and supplies obtained DC power (12A) to a common bus (B). A Δ-Y connection type three-phase transformer (2) outputs three-phase AC power (11B) of a voltage phase shifted by π/6 from the three-phase AC power (11A). A three-phase full-wave rectifier (22) performs full-wave rectification of the three-phase AC power (11B) output from the three-phase transformer (2), and supplies obtained DC power (12B) to the common bus (B).

8 Claims, 7 Drawing Sheets

CRANE APPARATUS, CONTAINER YARD, AND FEEDING METHOD

TECHNICAL FIELD

The present invention relates to a crane apparatus that performs handling of containers by power fed via a feeder line extending along a lane.

BACKGROUND ART

As a container yard where handling such as loading/unloading of containers on/from a ship or a trailer by using a crane apparatus, there is a so-called motorized container yard where power is fed from ground power equipment to a crane apparatus via a feeder line extending along a lane (see, e.g., patent literature 1).

As shown in FIG. 11, a container yard 100 is located to face a wharf 7A of a harbor. Container cranes 7C arranged at the wharf 7A load/unload containers 9 on/from a ship 7B.

The container yard 100 is divided into a plurality of handling regions, i.e., berths 70 along the wharf 7A in accordance with the arrangement position and use purpose.

A plurality of lanes 72, each of which is formed from an area of a rectangular shape, when viewed from the top, extending in the longitudinal direction of the container 9, are provided in each berth 70. Crane apparatuses 10 travel in the lanes 72 in a longitudinal direction X of the lanes 72 to efficiently sort the containers 9 mounted in the lanes 72. FIG. 11 shows an example in which the containers 9 are mounted in a direction parallel to a quay. However, the direction is not limited to this, and the containers 9 are mounted in a direction perpendicular to the quay in some cases.

Each lane 72 is equipped with a three-phase transformer (3-PT) 7 that supplies power to the crane apparatus 10. Power is supplied from the three-phase transformer 7 to the crane apparatus 10 via a feeder line 8 extending along the lane 72. The feeder line 8 is constituted by a trolley line (bus bar) installed on a column. A current collector mounted on the crane apparatus 10 is brought into electrical contact with the feeder line 8, and the crane apparatus 10 collects power from the three-phase transformer 7. Power receiving equipment 71 that receives commercial power and transforms its voltage is provided in each berth 70. Operating power obtained by the power receiving equipment 71 is supplied to each three-phase transformer 7 in the berth 70.

Note that the feeder line 8 is not limited to the trolley line, and a general cable reel or a cable reel carrier may be used. FIG. 11 shows an example in which the feeder lines 8 extend adjacently at adjacent ends of the two adjacent lanes 72. However, the feeder lines 8 are not limited to this and extend at identical ends individually in the respective lanes 72 in some cases.

In the container yard 100, a gate G is provided on the side of a road L. Trailers 75 pass the gate G and load/unload the containers 9.

Passages for the trailers 75 are provided in the lanes 72. The crane apparatuses 10 load/unload the containers 9 on/from the trailers 75 parked on the passages.

Although the crane apparatus 10 may be arranged in association with each lane 72, handling can be performed efficiently by moving the crane apparatus 10 to another lane 72. In this case, the crane apparatus 10 caused to perform right-angle traveling in a right-angle direction Y perpendicular to the longitudinal direction X in a turn lane 74 provided to be adjacent to the end portion of the lane 72.

RELATED ART LITERATURE

Patent Literature

Patent Literature 1: Japanese Patent Laid-Open No. 2009-023817

Non-Patent Literature

Non-Patent Literature 1: "Harmonics Suppression Technical Guideline" (Electric Association Guide for Harmonics), JEAG 9702-1995, Electro-technical Code Committee of The Japan Electric Association, 3rd Edition, 15 Oct. 1995

DISCLOSURE OF INVENTION

Problem to be Solved by the Invention

In such a motorized container yard, an inverter is mounted in each crane apparatus 10. DC power obtained by AC/DC-converting power supplied from the three-phase transformer 7 via the feeder line 8 by a three-phase full-wave rectifier is further DC/AC-converted by the inverter to drive a hoist motor or travel motor constituted by an AC motor. Alternatively, a hoist motor or travel motor constituted by a DC motor is driven by driving DC power obtained by further converting the voltage of this DC power.

It is known that harmonic waves higher in frequency than the fundamental wave of commercial power are generated at the time of AC/DC conversion in the three-phase full-wave rectifier. When such harmonic waves leak at high level from the crane apparatus 10 to a commercial power system via the feeder line 8 and the three-phase transformer 7, adverse effects may be exerted on other electrical devices that use power of the commercial power system.

To prevent this, the container yard requires a harmonic wave measure to, for example, provide, in the three-phase transformer 7 or host power receiving equipment, a PWM converter or high-frequency filter that suppresses harmonic waves leaking to the commercial power system. However, the harmonic wave suppressing equipment is often a very expensive product, and large power-compliant equipment for the container yard or the like is more expensive, so the initial investment imposes a heavy burden.

The present invention has been made to solve the above problems, and has as its object to provide a crane apparatus capable of taking a harmonic wave measure effectively at low cost.

Means of Solution to the Problem

To achieve this object, according to the present invention, there is provided a crane apparatus comprising a first three-phase full-wave rectifier configured to perform full-wave rectification of first three-phase AC power supplied from ground power supply equipment, and to supply obtained DC power to a common bus, a three-phase transformer configured to output second three-phase AC power of a voltage phase shifted by π/6 from the first three-phase AC power, a second three-phase full-wave rectifier configured to perform full-wave rectification of the second three-phase AC power output from the three-phase transformer, and to supply obtained DC power to the common bus, and an inverter configured to convert, into AC powers, the DC powers supplied from the first and second three-phase full-wave rectifiers to the common bus, and to drive a motor configured to hoist and lower a container.

According to the present invention, there is provided a container yard comprising feeder lines extending in a mounting place of a container and configured to feed operating power to a crane apparatus which performs handling of the container, and a plurality of three-phase transformers that provided for the respective feeder lines, and configured to transform a voltage of power-supply power supplied from host power supply equipment, and to supply obtained operating power to the feeder lines, wherein one of two paired three-phase transformers among the three-phase transformers is constituted by a first three-phase transformer configured to output, as the operating power, first three-phase AC power of the same voltage phase as a voltage phase of the power-supply power, and the other three-phase transformer of the two paired three-phase transformers is constituted by a second three-phase transformer configured to output, as the operating power, second three-phase AC power of a voltage phase shifted by $\pi/6$ from the voltage phase of the power-supply power.

According to the present invention, there is provided a feeding method used in a crane apparatus that hoists and lowers a container by converting DC power supplied to a common bus into AC power by an inverter, and driving a motor, comprising the steps of causing a first three-phase full-wave rectifier to perform full-wave rectification of first three-phase AC power supplied from ground power supply equipment, and supply obtained DC power to the common bus, causing a three-phase transformer to output second three-phase AC power of a voltage phase shifted by $\pi/6$ from the first three-phase AC power, and causing a second three-phase full-wave rectifier to perform full-wave rectification of the second three-phase AC power output from the three-phase transformer, and supply obtained DC power to the common bus.

According to the present invention, there is provided a feeding method used in a container yard including feeder lines extending in a mounting place of a container and configured to feed operating power to a crane apparatus which performs handling of the container, and a plurality of three-phase transformers provided for the respective feeder lines, and configured to transform a voltage of power-supply power supplied from host power supply equipment, and to supply obtained operating power to the feeder lines, comprising the steps of causing a first three-phase transformer that is one of two paired three-phase transformers among the three-phase transformers to output, as the operating power, first three-phase AC power of the same voltage phase as a voltage phase of the power-supply power, and causing a second three-phase transformer that is the other three-phase transformer of the two paired three-phase transformers to output, as the operating power, second three-phase AC power of a voltage phase shifted by $\pi/6$ from the voltage phase of the power-supply power.

Effect of the Invention

According to the present invention, the fifth and seventh harmonic waves of the fundamental wave generated in accordance with full-wave rectification by the three-phase full-wave rectifiers have opposite phases on the primary side of the three-phase transformer, and cancel each other. As a result, the harmonic waves leaking to the three-phase transformer serving as ground equipment, i.e., the commercial power system are suppressed.

A harmonic wave measure can therefore be taken by only adding the three-phase transformer to the crane apparatus, in comparison with a case in which very expensive equipment such as a PWM converter or a high-frequency filter for suppressing harmonic waves leaking to the commercial power system is provided in the three-phase transformer or the host power receiving equipment in the container yard. The three-phase transformer suffices to be a general one and be a relatively small-scale one having a capacity enough to cover power used in one crane apparatus, so a harmonic wave measure can be taken effectively at low cost. Thus, the initial investment of the container yard can be greatly reduced.

BEST MODE FOR CARRYING OUT THE INVENTION

Embodiments of the present invention will now be described with reference to the accompanying drawings.

First Embodiment

First, a crane apparatus 10 according to the first embodiment of the present invention will be described with reference to FIG. 1.

Figure 1:
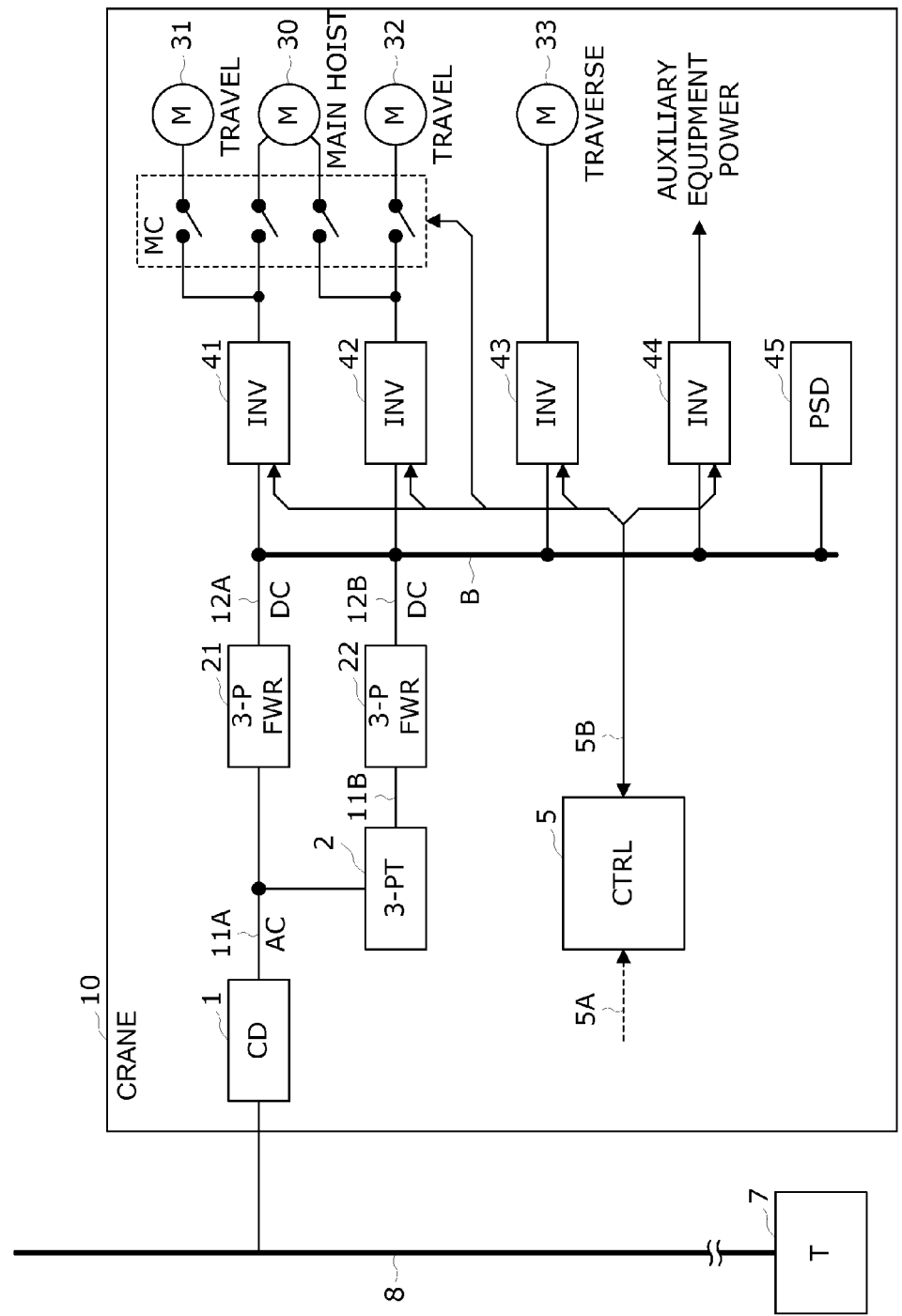
FIG. 1 is a block diagram showing the arrangement of a crane apparatus according to the first embodiment.

As shown in FIG. 1, the crane apparatus 10 is a crane apparatus that performs various crane operations such as loading/unloading of cargos such as containers and traveling in a container yard by driving various motors using power from a transformer (power supply device) 7 via a feeder line 8 extending along a lane in the container yard.

The crane apparatus 10 includes, as main building components, a connecting device (CD) 1, a three-phase transformer (3-PT) 2, a three-phase full-wave rectifier (3-P FWR) (first three-phase full-wave rectifier) 21, a three-phase full-wave rectifier (second three-phase full-wave rectifier) 22, a main hoist motor 30, travel motors 31 and 32, a traverse motor 33, inverters (INVs) 41, 42, 43, and 44, a controller (CTRL) 5, and a common bus B.

The connecting device (CD) 1 is attached outside the crane apparatus 10, and has a function of electrically connecting to the feeder line 8 to receive three-phase AC power from the three-phase transformer 7.

The three-phase transformer 2 is constituted by a Δ-Y connection type or Y-Δ connection type three-phase transformer. The three-phase transformer 2 has a function of converting a three-phase AC power (first three-phase AC power) 11A received by the connecting device (CD) 1 into a three-phase AC power (second three-phase AC power) 11B of a voltage phase shifted by $\pi/6$ from the three-phase AC power 11A, and outputting the three-phase AC power 11B.

The three-phase full-wave rectifier 21 is constituted by a semiconductor rectification element such as a diode, and has a function of converting the three-phase AC power 11A from the connecting device (CD) 1 into a DC power 12A, and outputting the DC power 12A to the common bus B.

The three-phase full-wave rectifier 22 is constituted by a semiconductor rectification element such as a diode, and has a function of converting the three-phase AC power 11B from the three-phase transformer 2 into a DC power 12B, and outputting the DC power 12B to the common bus B.

The main hoist motor 30 is an AC motor for moving up/down a container.

The travel motors 31 and 32 are AC motors for causing the crane apparatus 10 to travel in the lane extending direction. The travel motors 31 and 32 are used even when the crane apparatus 10 is caused to perform right-angle traveling in a direction perpendicular to the lane extending direction at the time of lane change to a different lane.

The traverse motor 33 is an AC motor for causing a trolley provided at the top of the crane apparatus 10 to traverse in a direction crossing the lane extending direction.

The inverter 41 is a DC/AC converter that converts, into AC power, DC power output from the three-phase full-wave rectifier 21 or 22 to the common bus B, and supplies the AC power to the main hoist motor 30 or the travel motor 31 via an electromagnetic contactor MC.

The inverter 42 is a DC/AC converter that converts, into AC power, DC power output from the three-phase full-wave rectifier 21 or 22 to the common bus B, and supplies the AC power to the main hoist motor 30 or the travel motor 32 via the electromagnetic contactor MC.

The inverter 43 is a DC/AC converter that converts, into AC power, DC power output from the three-phase full-wave rectifier 21 or 22 to the common bus B, and supplies the AC power to the traverse motor 33. Note that two motors (2WD) or four motors (4WD) are adopted as the traverse motor 33 in some cases, and the number of installed inverters 43 is also increased/decreased in accordance with the traverse motor 33.

The inverter 44 is a DC/AC converter that converts, into AC power, DC power output from the three-phase full-wave rectifier 21 or 22 to the common bus B, and supplies the AC power as power for various pieces of auxiliary equipment including a lighting unit, an air-conditioner, or a control device such as the controller 5.

A power storage device (PSD) 45 is constituted by a capacitor or a lithium ion battery, and has a function of storing part of DC power on the common bus B, and when the connecting device (CD) 1 leaves the feeder line 8 and ground feeding is stopped at the time of large-power consumption for container hoisting, at the time of lane change, or the like, supplying the stored DC power to the common bus. If necessary, a chopper (booster) may be installed between the common bus B and the power storage device 45 to perform current control.

The controller 5 includes a microprocessor such as a CPU, and a peripheral circuit, and has various functions for controlling the overall crane apparatus 10 by programs and the hardware in cooperation with each other by loading and executing the programs from a memory provided in the microprocessor or the peripheral circuit.

The main function of the controller 5 is a crane operation function of controlling operations such as container elevation, frame traveling, and traverse by exchanging various commands 5B based on an instruction input 5A from the operator that has been detected via an operation lever or an operation switch, and controlling the inverters 41 to 44 and the electromagnetic contactor MC.

[Operation According to First Embodiment]

The operation of the crane apparatus 10 according to this embodiment will be explained with reference to FIGS. 2 to 4.

Figure 2:
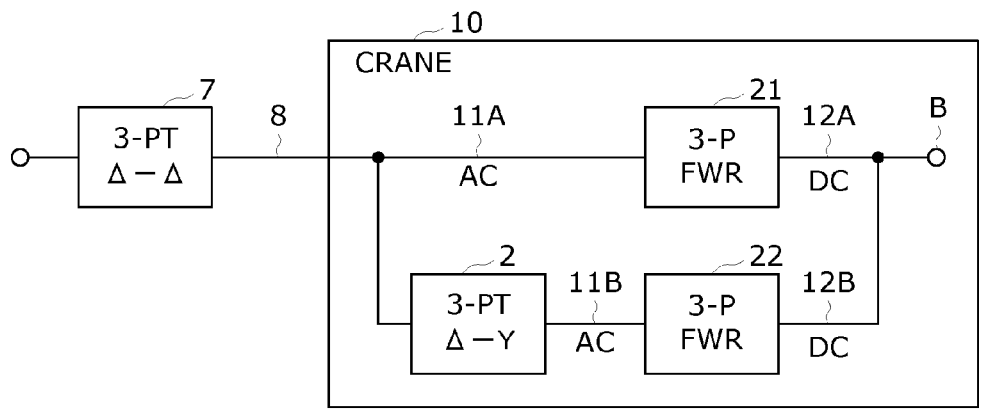
FIG. 2 is a block diagram showing the power system of the crane apparatus according to the first embodiment.
Figure 3:
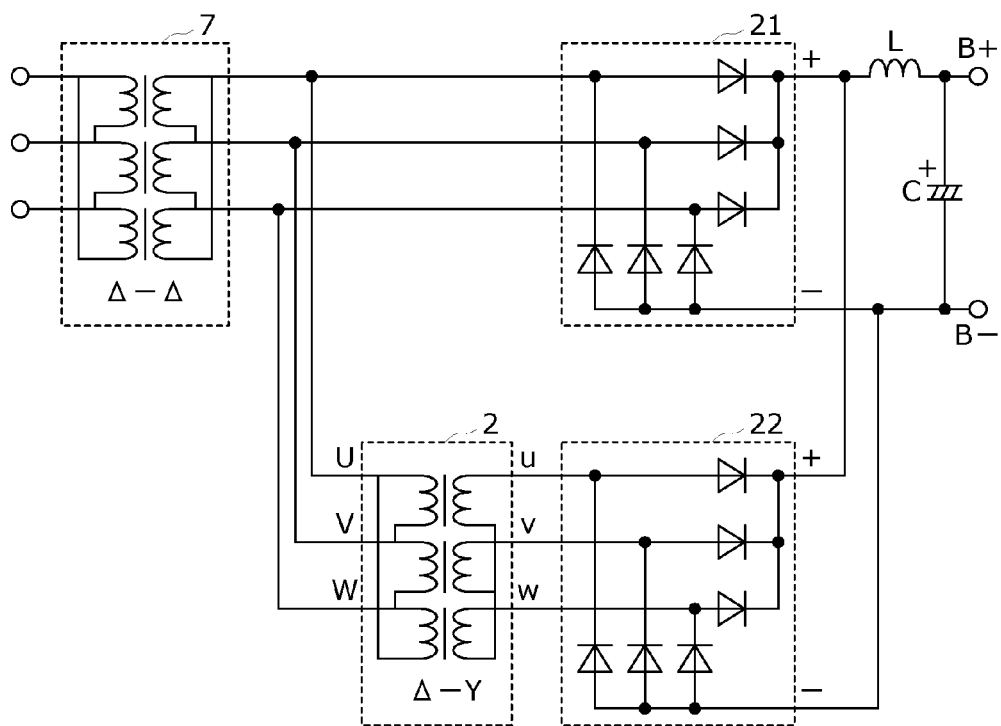
FIG. 3 is a circuit diagram showing the power system of the crane apparatus according to the first embodiment.
Figure 4:
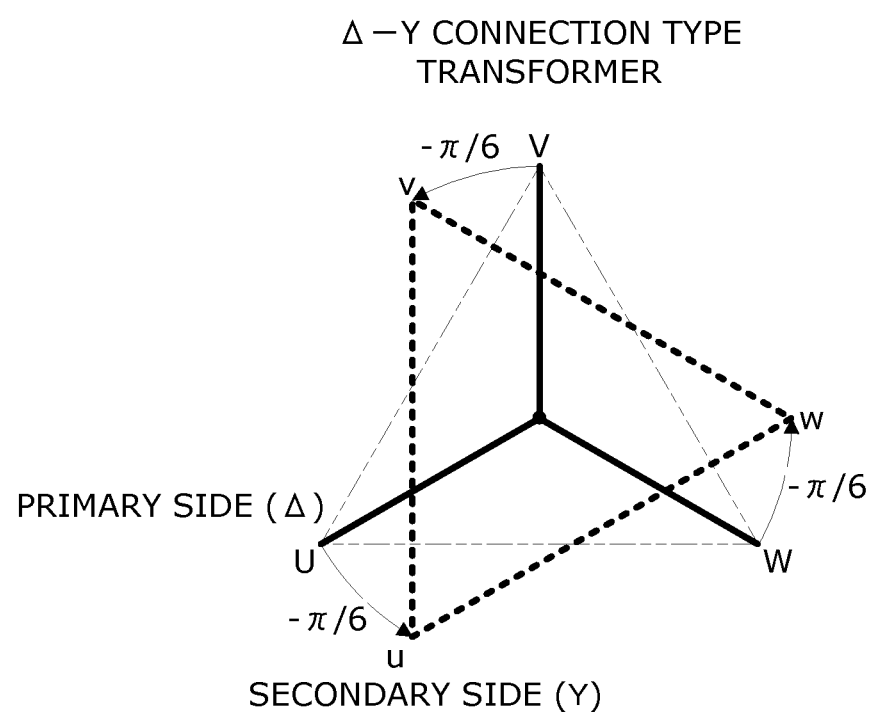
FIG. 4 is an explanatory view showing a voltage phase in a Δ-Y connection type transformer.

In the crane apparatus 10 according to this embodiment, three-phase AC power supplied from the three-phase transformer 7 serving as ground equipment via the feeder line 8 is distributed to the three-phase transformer 2 and the three-phase full-wave rectifier 21, as shown in FIGS. 2 and 3.

In the example of FIG. 3, a Δ-Δ connection type three-phase transformer is used as the three-phase transformer 7, and a Δ-Y connection type three-phase transformer is used as the three-phase transformer 2. The three-phase full-wave rectifiers 21 and 22 are constituted by three-phase full-wave rectification bridge circuits using diodes as rectification elements.

The positive output terminal + of the three-phase full-wave rectifier 21 is connected to the positive output terminal + of the three-phase full-wave rectifier 22, and connected to the positive terminal of a smoothing capacitor C via a DC reactance L.

The negative output terminal − of the three-phase full-wave rectifier 21 is connected to the negative output terminal − of the three-phase full-wave rectifier 22, and connected to the negative terminal of the smoothing capacitor C. The positive wire B+ and negative wire B− of the common bus B are connected to the positive terminal and negative terminal of the smoothing capacitor C.

As for the three-phase transformer that transforms the voltage of three-phase AC power, there are combinations of two connection methods of Δ (delta) connection and Y (star) connection regarding the primary side winding and the secondary side winding, that is, four connection types Δ-Δ, Δ-Y, Y-Δ, and Y-Y.

The Δ connection is a connection that connects the three respective phases in a direction in which a phase voltage is applied, forming a closed circuit. The end portions of three windings are series-connected into a ring shape, and the three respective phases are connected to the three connection points.

The Y connection is a connection that connects the three respective phases at a neutral point at one end. Three windings are commonly connected at one end to the neutral point, and the three respective phases are connected to the three windings at the other end.

As for the Δ-Δ connection method and Y-Y connection method out of these four types of three-phase transformers, connection methods on the primary and secondary sides are the same, so no shift is generated in the voltage phase on the primary and secondary sides. To the contrary, in the Δ-Y connection method, the voltage phase on the secondary side leads by $\pi/6$ in comparison with the primary side, as shown in FIG. 4.

Generally, when the three-phase full-wave rectifier performs full-wave rectification of three-phase AC power, a ripple in a 1/6 cycle of the fundamental wave is generated in the obtained DC voltage waveform, and higher harmonic waves mainly containing the fifth and seventh harmonic waves are generated in an AC current waveform input to the three-phase full-wave rectifier. These harmonic waves on the AC current waveform generally have a tendency to decrease the level as the order increases. More specifically, the content of each harmonic component with respect to the fundamental wave is 17.5% for the fifth harmonic wave, 11.0% for the seventh harmonic wave, 4.5% for the 11th harmonic wave, and 3.0% for the 13th harmonic wave. An effective harmonic wave measure is therefore to reduce the fifth and seventh harmonic waves of relatively high levels.

When a series circuit of the three-phase transformer 2 and three-phase full-wave rectifier 22 is parallelly connected to the primary and secondary sides of the three-phase full-wave rectifier 21, as shown in FIGS. 2 and 3, the AC power 11B having a phase difference of π/6 of the fundamental wave with respect to the three-phase AC power 11A input to the three-phase full-wave rectifier 21 is input to the three-phase full-wave rectifier 22.

Thus, as described in "(2) cancellation effect", pp. 88-91 in non-patent literature 1 and "3.2.1 multiple pulsing", pp. 108-120 in the same literature, the fifth and seventh harmonic waves from the three-phase transformer 2 and the fifth and seventh harmonic waves from the three-phase full-wave rectifier 21 have opposite phases, and cancel each other on the primary side of the three-phase transformer 2, lowering the level. As a result, the harmonic waves leaking to the three-phase transformer 7, i.e., the commercial power system are suppressed.

[Effects of First Embodiment]

As described above, according to the first embodiment, the three-phase full-wave rectifier 21 performs full-wave rectification of the three-phase AC power 11A supplied from ground power supply equipment, and supplies the obtained DC power 12A to the common bus B. The Δ-Y connection type three-phase transformer 2 outputs the three-phase AC power 11B of a voltage phase shifted by π/6 from the three-phase AC power 11A. The three-phase full-wave rectifier 22 performs full-wave rectification of the three-phase AC power 11B output from the three-phase transformer 2, and supplies the obtained DC power 12B to the common bus B.

The fifth and seventh harmonic waves of the fundamental wave generated in accordance with full-wave rectification by the three-phase full-wave rectifiers have opposite phases on the primary side of the three-phase transformer 2, and cancel each other. As a result, the harmonic waves leaking to the three-phase transformer 7 serving as ground equipment, i.e., the commercial power system are suppressed.

A harmonic wave measure can therefore be taken by only adding the three-phase transformer 2 to the crane apparatus 10, in comparison with a case in which very expensive equipment such as a PWM converter or a high-frequency filter for suppressing harmonic waves leaking to the commercial power system is provided in the three-phase transformer 7 or the host power receiving equipment in the container yard. The three-phase transformer suffices to be a general one and be a relatively small-scale one having a capacity enough to cover power used in one crane apparatus, so a harmonic wave measure can be taken effectively at low cost. Thus, the initial investment of the container yard can be greatly reduced.

According to this embodiment, outputs from the three-phase full-wave rectifiers 21 and 22 are parallelly supplied to the common bus B, and the magnitudes of currents flowing through the three-phase full-wave rectifiers 21 and 22 become almost equal. The levels of harmonic waves deriving from the three-phase full-wave rectifiers 21 and 22 also become almost equal, and the harmonic waves can be reduced very effectively.

In this embodiment, in the case of taking a harmonic wave measure for the three-phase full-wave rectifiers 21 and 22, when AC power of the same voltage phase as that of power-supply power from the feeder line 8 is supplied to one three-phase full-wave rectifier 21, the power-supply power from the feeder line 8 is directly supplied to the three-phase full-wave rectifier 21 by paying attention to the fact that a power supply line length is short in the crane apparatus 10 in comparison with the ground feeder line 8, and the influence on supply of the AC power is small. For this reason, a Δ-Δ connection type or Y-Y connection type in-phase three-phase transformer can be omitted, and the circuit scale of the crane apparatus 10 can be reduced.

Note that this embodiment has exemplified a case in which a Δ-Δ connection type three-phase transformer is used as the three-phase transformer 7 serving as ground equipment. However, the present invention is not limited to this, and a three-phase transformer of another connection type such as Δ-Y, Y-Δ, or Y-Y may be used. There is no special relationship between the connection method of the three-phase transformer 7 and the connection method of the three-phase transformer 2.

Also, this embodiment has exemplified a case in which the motors 30 to 33 each constituted by an AC motor are driven by AC powers obtained by converting DC power on the common bus B by the inverters 41 to 43 in the crane apparatus 10. However, the present invention is not limited to this. Even when the motors 30 to 33 each constituted by a DC motor are driven by DC powers obtained by converting DC power on the common bus B by the inverters 41 to 43, this embodiment can be applied in the above-described fashion, and the same operation effects as those described above can be obtained.

Second Embodiment

A crane apparatus 10 according to the second embodiment of the present invention will be described with reference to FIGS. 5 to 7.

The first embodiment has exemplified a case in which a Δ-Y connection type three-phase transformer is used as the three-phase transformer 2. The second embodiment will explain a case in which a Y-Δ connection type three-phase transformer is used as a three-phase transformer 2.

Figure 5:
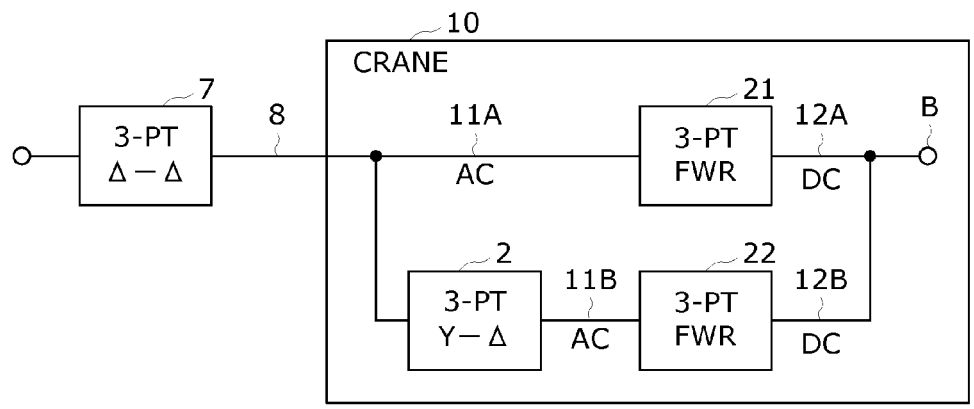
FIG. 5 is a block diagram showing the power system of a crane apparatus according to the second embodiment.
Figure 6:
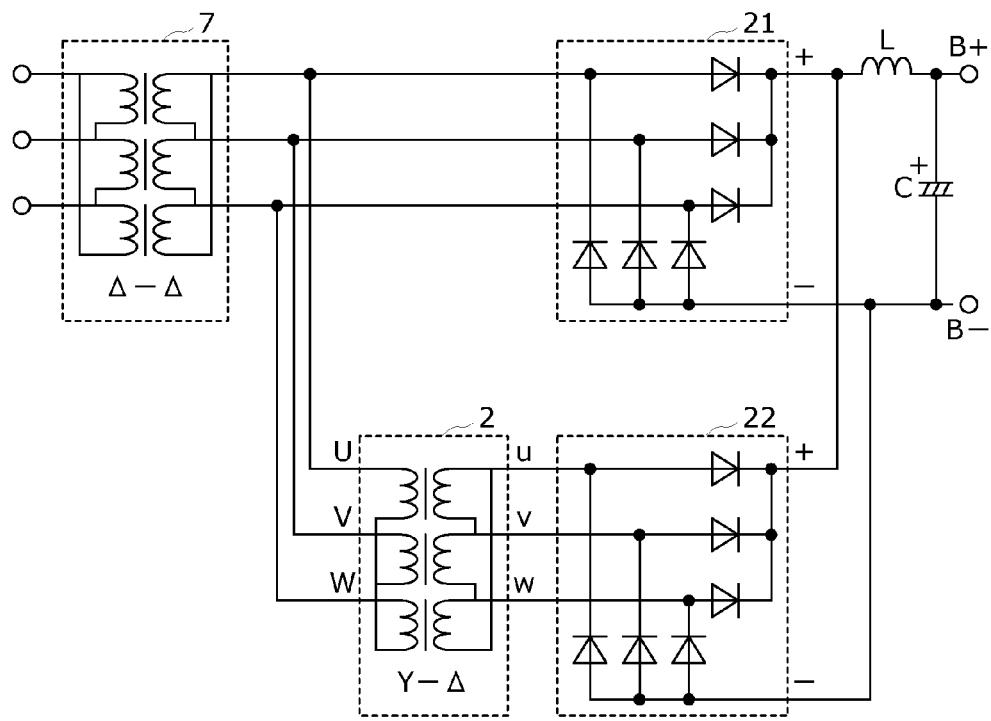
FIG. 6 is a circuit diagram showing the power system of the crane apparatus according to the second embodiment.

In the crane apparatus 10 according to the second embodiment, three-phase AC power supplied from a three-phase transformer 7 serving as ground equipment via a feeder line 8 is distributed to the three-phase transformer 2 and a three-phase full-wave rectifier 21, as shown in FIGS. 5 and 6.

In the example of FIG. 6, a Δ-Δ connection type three-phase transformer is used as the three-phase transformer 7, and a Y-Δ connection type three-phase transformer is used as the three-phase transformer 2. The three-phase full-wave rectifier 21 and a three-phase full-wave rectifier 22 are constituted by three-phase full-wave rectification bridge circuits using diodes as rectification elements.

The positive output terminal + of the three-phase full-wave rectifier 21 is connected to the positive output terminal + of the three-phase full-wave rectifier 22, and connected to the positive terminal of a smoothing capacitor C via a DC reactance L.

The negative output terminal − of the three-phase full-wave rectifier 21 is connected to the negative output terminal − of the three-phase full-wave rectifier 22, and connected to the negative terminal of the smoothing capacitor C. The positive wire B+ and negative wire B− of a common bus B are connected to the positive terminal and negative terminal of the smoothing capacitor C.

Figure 7:
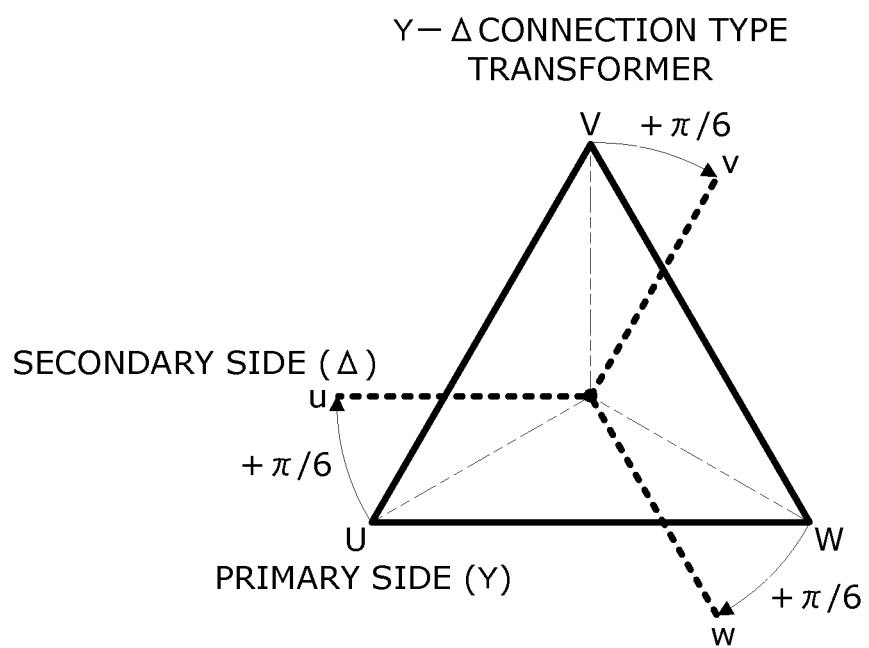
FIG. 7 is an explanatory view showing a voltage phase in a Y-Δ connection type transformer.

In the Y-Δ connection method, the voltage phase on the secondary side lags by π/6, compared to the primary side, as shown in FIG. 7. Hence, when a series circuit of the three-phase transformer 2 and three-phase full-wave rectifier 22 is parallelly connected to the primary and secondary sides of the three-phase full-wave rectifier 21, as shown in FIGS. 5 and 6, an AC power 11B having a phase difference of π/6 of the fundamental wave with respect to a three-phase AC power 11A input to the three-phase full-wave rectifier 21 is input to the three-phase full-wave rectifier 22.

According to the same principle as that described in the first embodiment, the fifth and seventh harmonic waves from the three-phase transformer 2 and the fifth and seventh harmonic waves from the three-phase full-wave rectifier 21 have opposite phases, and cancel each other on the primary side of the three-phase transformer 2, lowering the level. As a result, the harmonic waves leaking to the three-phase transformer 7, i.e., the commercial power system are suppressed.

[Effects of Second Embodiment]

As described above, the second embodiment uses a Y-Δ connection type three-phase transformer as the three-phase transformer 2 in the first embodiment. The fifth and seventh harmonic waves of the fundamental wave generated in accordance with full-wave rectification by the three-phase full-wave rectifiers 21 and 22 have opposite phases on the primary side of the three-phase transformer 2, and cancel each other. As a result, the harmonic waves leaking to the three-phase transformer 7, i.e., the commercial power system are suppressed. The same operation effects as those in the first embodiment can be obtained.

Third Embodiment

A container yard according to the third embodiment of the present invention will be described with reference to FIG. 8.

The first and second embodiments have exemplified a case in which the three-phase transformer that shifts a voltage phase is provided in the crane apparatus 10 and leakage of harmonic waves to the three-phase transformer 7 is suppressed. The third embodiment will explain a case in which a harmonic wave measure is taken by shifting a voltage phase by a three-phase transformer 7 serving as ground equipment installed in a container yard 100, as shown in FIG. 8.

Figure 8:
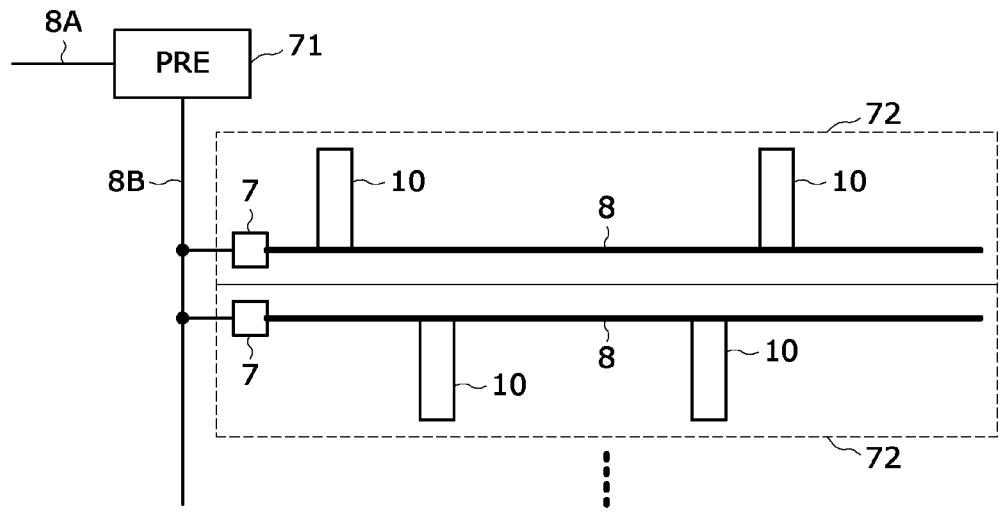
FIG. 8 is a block diagram showing the feeding arrangement of a container yard according to the third embodiment.

In the case of FIG. 8, two three-phase transformers 7 provided in respective adjacent lanes 72 are paired and connected to power receiving equipment 71 via a feeder line 8B. Commercial power is supplied from a substation to the power receiving equipment 71 via a feeder line 8A.

In this embodiment, one of the two paired three-phase transformers 7 is constituted by, e.g., a Δ-Δ connection type or Y-Y connection type first three-phase transformer that generates the first three-phase AC power of the same voltage phase as that of power-supply power from the power receiving equipment 71, and outputs the first three-phase AC power as operating power to a feeder line 8.

Also, the other one of the two paired three-phase transformers 7 is constituted by, e.g., a Δ-Y connection type or Y-Δ connection type second three-phase transformer that generates the second three-phase AC power of a voltage phase shifted by π/6 from that of power-supply power from the power receiving equipment 71, and outputs the second three-phase AC power as operating power to the feeder line 8.

According to the same principle as that described in the first embodiment, the fifth and seventh harmonic waves generated from a crane apparatus 10 connected to the feeder line 8 of one three-phase transformer 7, and the fifth and seventh harmonic waves generated from the crane apparatus 10 connected to the feeder line 8 of the other three-phase transformer 7 cancel each other on the feeder line 8B on the primary sides of the three-phase transformers 7, lowering the levels. As a result, the harmonic waves leaking to the power receiving equipment 71, i.e., the commercial power system are suppressed.

Figure 9:
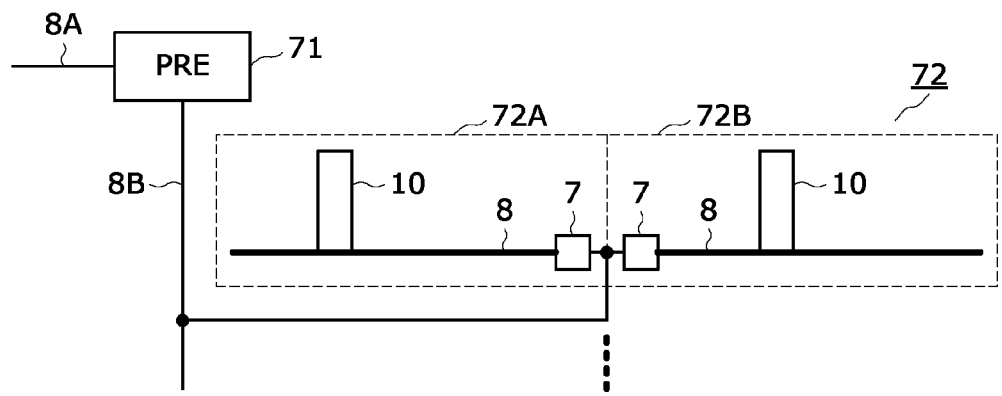
FIG. 9 is a block diagram showing the feeding arrangement of another container yard according to the third embodiment.

The two paired three-phase transformers 7 are not limited to those provided on the two lanes 72. In the example of FIG. 9, the three-phase transformers 7 are provided for two respective blocks 72A and 72B provided by dividing one lane 72. With this arrangement, operating power can be fed from the center of the lane 72 to the feeder line 8, the distance of the feeder line 8 from the three-phase transformer 7 to the crane apparatus 10 can be shortened on average, and the power loss on the feeder line 8 can be suppressed.

In this arrangement, the three-phase transformers 7 provided in the respective blocks 72A and 72B can be regarded as a pair. Hence, for example, the three-phase transformer 7 in the block 72A is constituted by, e.g., a Δ-Δ connection type or Y-Y connection type first three-phase transformer that generates the first three-phase AC power of the same voltage phase as that of power-supply power from the power receiving equipment 71, and outputs the first three-phase AC power as operating power to the feeder line 8. Also, the three-phase transformer 7 in the block 72B is constituted by, e.g., a Δ-Y connection type or Y-Δ connection type second three-phase transformer that generates the second three-phase AC power of a voltage phase shifted by π/6 from that of power-supply power from the power receiving equipment 71, and outputs the second three-phase AC power as operating power to the feeder line 8.

According to the same principle as that described in the first embodiment, the fifth and seventh harmonic waves generated from the crane apparatus 10 connected to the feeder line 8 of one three-phase transformer 7, and the fifth and seventh harmonic waves generated from the crane apparatus 10 connected to the feeder line 8 of the other three-phase transformer 7 cancel each other on the feeder line 8B on the primary sides of the three-phase transformers 7, lowering the level. As a result, the harmonic waves leaking to the power receiving equipment 71, i.e., the commercial power system are suppressed.

Figure 10:
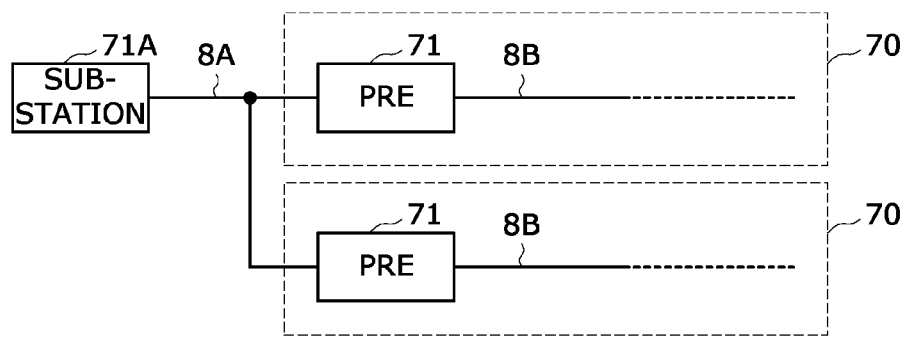
FIG. 10 is a block diagram showing the feeding arrangement of another container yard according to the third embodiment.
Figure 11:
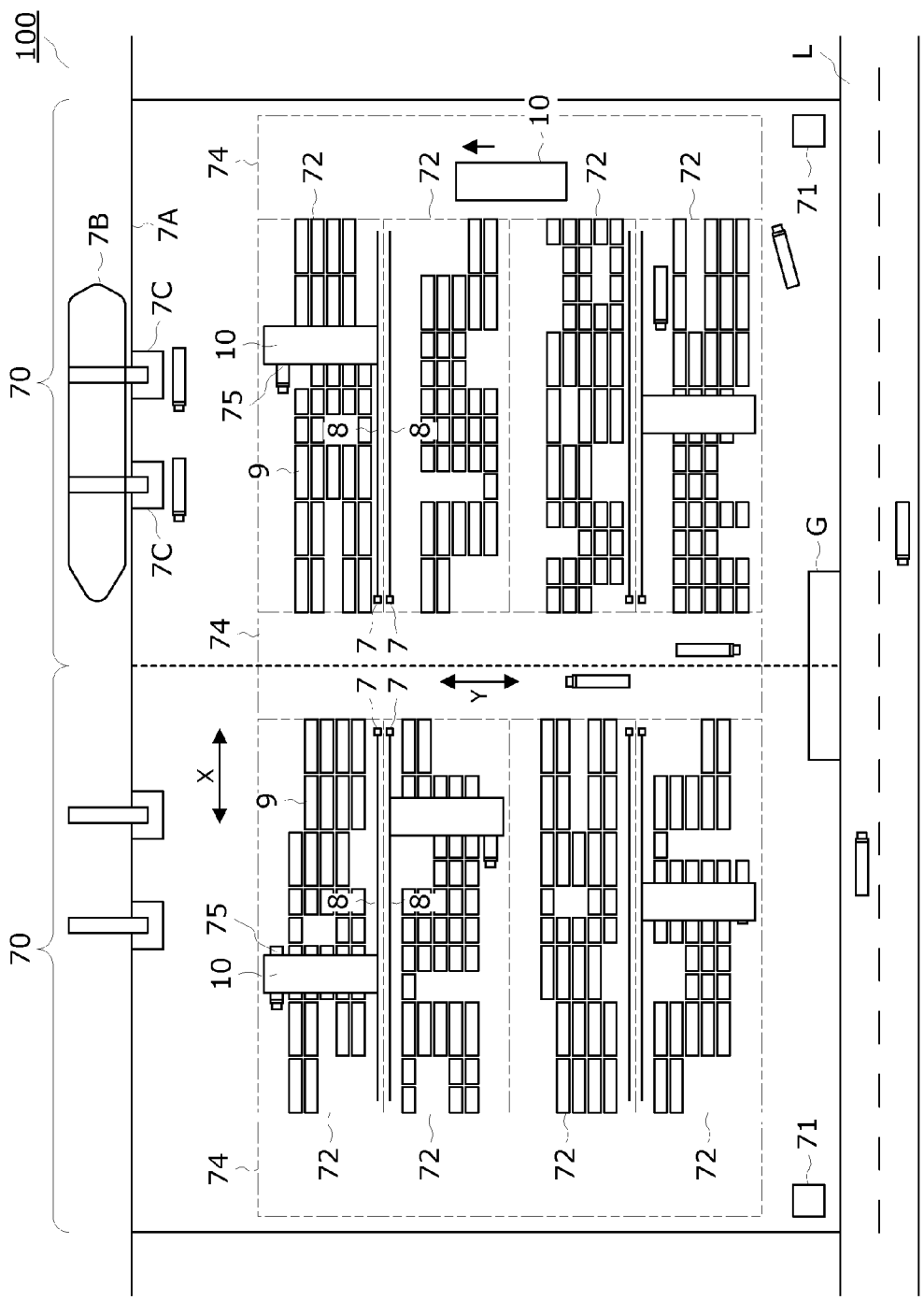
FIG. 11 is a plan view showing an example of the arrangement of a general container yard.

Further, the present invention is not limited to the three-phase transformer 7 provided in the lane 72. In the example of FIG. 10, pieces of power receiving equipment 71 are provided in two respective berths 70 provided by dividing the container yard 100. The pieces of power receiving equipment 71 incorporate three-phase transformers for stepping down the voltage of power-supply power fed at high voltage from substation equipment 71A via the feeder line 8A.

The three-phase transformer of one power receiving equipment 71 is constituted by, e.g., a Δ-Δ connection type or Y-Y connection type first three-phase transformer that generates the first three-phase AC power of the same voltage phase as that of power-supply power from the substation equipment 71A, and outputs the first three-phase AC power as operating power to the feeder line 8B. Also, the three-phase transformer of the other power receiving equipment 71 is constituted by, e.g., a Δ-Y connection type or Y-Δ connection type second three-phase transformer that generates the second three-phase AC power of a voltage phase shifted by π/6 from that of power-supply power from the substation equipment 71A, and supplies the second three-phase AC power as operating power to the feeder line 8B.

According to the same principle as that described in the first embodiment, the fifth and seventh harmonic waves generated from the crane apparatus 10 connected to the feeder line 8B of one power receiving equipment 71, and the fifth and seventh harmonic waves generated from the crane apparatus 10 connected to the feeder line 8B of the other power receiving equipment 71 cancel each other on the feeder line 8A on the primary sides of the pieces of power receiving equipment 71, lowering the levels. As a result, the harmonic waves leaking to the substation equipment 71A, i.e., the commercial power system are suppressed.

[Effects of Third Embodiment]

As described above, of the three-phase transformers 7 that are provided for respective feeder lines in the container yard 100, transform the voltage of power-supply power supplied from host power supply equipment, and supply the obtained operating power to the feeder lines, one of the two paired three-phase transformers 7 outputs, as operating power, the first three-phase AC power of the same voltage phase as that of power-supply power. The other one of the two paired three-phase transformers 7 outputs, as operating power, the second three-phase AC power of a voltage phase shifted by π/6 from that of power-supply power.

According to the same principle as that described in the first embodiment, the fifth and seventh harmonic waves generated from the crane apparatus 10 connected to the feeder line 8 of one three-phase transformer 7, and the fifth and seventh harmonic waves generated from the crane apparatus 10 connected to the feeder line 8 of the other three-phase transformer 7 cancel each other on the feeder line 8B on the primary sides of the three-phase transformers 7, lowering the levels. As a result, the harmonic waves leaking to the commercial power system are suppressed.

[Extension of Embodiments]

The present invention has been described above by referring to the embodiments, but is not limited to these embodiments. Various changes understandable by those skilled in the art can be made for the arrangements and details of the present invention without departing from the scope of the invention. In addition, the embodiments can be arbitrarily combined and implemented within a consistent range.

Explanation of the Reference Numerals and Signs

10 . . . crane apparatus, 1 . . . connecting device (CD), 11A . . . three-phase AC power (first three-phase AC power), 11B . . . three-phase AC power (second three-phase AC power), 12A, 12B . . . DC power, 2 . . . three-phase transformer (3-PT), 21 . . . three-phase full-wave rectifier (3-P FWR)(first three-phase full-wave rectifier), 22 . . . three-phase full-wave rectifier (3-P FWR) (second three-phase full-wave rectifier), 30 . . . main hoist motor, 31, 32 . . . travel motor, 33 . . . traverse motor, 41-44 . . . inverter (INV), 45 . . . power storage device (PSD), 5 . . . controller (CTRL), 5A . . . instruction input, 5B . . . command, 7 . . . three-phase transformer (3-PT)(power supply device), 100 . . . container yard, 70 . . . berth, 71 . . . power receiving equipment (PRE), 72 . . . lane, 72A, 72B . . . block, 74 . . . turn lane, 8, 8A, 8B . . . feeder line, 9 . . . container, B . . . common bus B

The invention claimed is:

1. A crane apparatus comprising:
a first three-phase full-wave rectifier configured to perform full-wave rectification of first three-phase AC power supplied from ground power supply equipment, and to supply obtained DC power to a common bus;
a three-phase transformer configured to output second three-phase AC power of a voltage phase shifted by π/6 from the first three-phase AC power;
a second three-phase full-wave rectifier configured to perform full-wave rectification of the second three-phase AC power output from said three-phase transformer, and to supply obtained DC power to the common bus; and
a motor configured to be driven to hoist and lower a container based on the DC powers supplied from said first and second three-phase full-wave rectifiers to the common bus.

2. The crane apparatus according to claim 1, wherein said three-phase transformer is constituted by a three-phase transformer of one of a Δ-Y connection type and a Y-Δ connection type.

3. A container yard comprising:
feeder lines extending in a mounting place of a container and configured to feed operating power to a crane apparatus which performs handling of the container; and
a plurality of three-phase transformers provided for said respective feeder lines, and configured to transform a voltage of power-supply power supplied from host power supply equipment, and to supply obtained operating power to said feeder lines,
wherein one of two paired three-phase transformers among said three-phase transformers is constituted by a first three-phase transformer configured to output, as the operating power, first three-phase AC power of the same voltage phase as a voltage phase of the power-supply power, and the other three-phase transformer of said two paired three-phase transformers is constituted by a second three-phase transformer configured to output, as the operating power, second three-phase AC power of a voltage phase shifted by π/6 from the voltage phase of the power-supply power.

4. The container yard according to claim 3, wherein said first three-phase transformer is constituted by a three-phase transformer of one of a Δ-Δ connection type and a Y-Y connection type, and said second three-phase transformer is constituted by a three-phase transformer of one of a Δ-Y connection type and a Y-Δ connection type.

5. A feeding method used in a crane apparatus that drives a motor to hoist and lower a container based on DC power supplied to a common bus, comprising the steps of:
causing a first three-phase full-wave rectifier to perform full-wave rectification of first three-phase AC power supplied from ground power supply equipment, and to supply obtained DC power to the common bus;
causing a three-phase transformer to output second three-phase AC power of a voltage phase shifted by π/6 from the first three-phase AC power; and
causing a second three-phase full-wave rectifier to perform full-wave rectification of the second three-phase AC power output from the three-phase transformer, and to supply obtained DC power to the common bus.

6. The feeding method according to claim 5, wherein the three-phase transformer is constituted by a three-phase transformer of one of a Δ-Y connection type and a Y-Δ connection type.

7. A feeding method used in a container yard including feeder lines extending in a mounting place of a container and configured to feed operating power to a crane apparatus which performs handling of the container, and a plurality of three-phase transformers provided for the respective feeder lines, and configured to transform a voltage of power-supply power supplied from host power supply equipment, and to supply obtained operating power to the feeder lines, comprising the steps of:
   causing a first three-phase transformer that is one of two paired three-phase transformers among the three-phase transformers to output, as the operating power, first three-phase AC power of the same voltage phase as a voltage phase of the power-supply power; and
   causing a second three-phase transformer that is the other three-phase transformer of the two paired three-phase transformers to output, as the operating power, second three-phase AC power of a voltage phase shifted by $\pi/6$ from the voltage phase of the power-supply power.

8. The feeding method according to claim 7, wherein the first three-phase transformer is constituted by a three-phase transformer of one of a Δ-Δ connection type and a Y-Y connection type, and the second three-phase transformer is constituted by a three-phase transformer of one of a Δ-Y connection type and a Y-Δ connection type.

* * * * *